United States Patent Office 3,796,733
Patented Mar. 12, 1974

3,796,733
PROCESS FOR MANUFACTURING DIBENZO
(a,h)PYRENE-7,14-DIONE
Joseph Peter Savoca, New Brunswick, N.J., assignor to
American Cyanamid Company, Stamford, Conn.
No Drawing. Filed Nov. 16, 1971, Ser. No. 199,339
Int. Cl. C09b 3/52
U.S. Cl. 260—362                              7 Claims

ABSTRACT OF THE DISCLOSURE

The process for producing dibenzo[a,h]pyrene-7,14-dione (Vat Yellow 4) by the dehydrogenation and ring-closure of 1,5-dibenzoylnaphthalene in an alkali metal chloride/aluminum chloride melt in the presence of a hydrogen acceptor is improved, and the product obtained in higher yield and purity, by adding the 1,5-dibenzoylnaphthalene and the hydrogen acceptor simultaneously to the melt.

---

This invention relates to the manufacture of Vat Yellow 4, an intermediate for Vat Orange 1. More particularly, it relates to an improvement in the process for making dibenzo[a,h]pyrene-7,14-dione (Vat Yellow 4) by the dehydrogenation and ring closure of 1,5-dibenzoylnaphthalene, whereby the dye product is obtained in greatly improved yield and quality.

Vat Yellow 4 (Color Index, Second Edition, C.I. 59100) is a commercial vat dye having the formula:

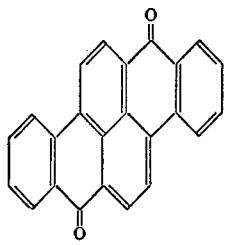

Vat Orange 1 (Color Index, Second Edition, C.I. 59105) is also a commercial vat dye. It is conventionally made by dibrominating dibenzo[a,h]pyrene - 7,14-dione (Vat Yellow 4). Chlorinated dyes are also known.

In the well-known process for converting 1,5-dibenzoylnaphthalene into dibenzo[a,h]pyrene-7,14-dione by ring closure, the naphthalene compound is heated in an alkali metal chloride-aluminum chloride mixture in the presence of a hydrogen acceptor. Oxygen (U.S. Pat. No. 1,901,307) and a wide variety of other inorganic oxidizing agents (U.S. Pat. No. 2,238,180) have been suggested for use as the hydrogen acceptor. The process was greatly improved when it was discovered that aromatic nitro compounds, which in addition to the nuclear-bound nitro group, contain, at least one other negative substituent, such as m-nitrobenzenesulfonic acid, picric acid, 4'-nitroacetanilide, m-dinitrobenzene, nitrochloronaphthalenes, etc., can be used (U.S. Pat. No. 2,238,180).

In the conventional processes (see U.S. Pat. Nos. 1,901,-307; 2,238,180; 2,838,525 and 3,024,254), the 1,5-dibenzoylnphthalene is dissolved in an alkali metal chloride-aluminum chloride melt and the hydrogen acceptor is then added slowly while the melt is maintained at a temperature between about 120° and 170° C. This procedure has the disadvantage that, during the prolonged heating period while the hydrogen acceptor is being added, a portion of the 1,5-dibenozylnaphthalene is converted to 1,8-dibenzoylnaphthalene. This rearrangement is harmful in two respects. Thus, the yield of desired product is decreased and the quality of the product is lowered because of the presence of the by-product.

In accordance with the present invention, it has been discovered that when the 1,5-dibenzoylnaphthalene and the hydrogen acceptor are added simultaneously to the alkali metal chloride-aluminum chloride melt, the rearrangement of 1,5-dibenzoylnaphthalene into 1,8-dibenzoylnaphthalene is greatly reduced, and the yield and quality of the product, dibenzo[a,h]pyrene-7,14-dione, are greatly improved.

The alkali metal chloride-aluminum chloride melt employed as the reaction medium is well known, and generally contains sufficient alkali-metal chloride, preferably sodium chloride, to render the medium fluid under the reaction, temperature employed. Usually the melt contains about 1 part by weight of sodium chloride for each 4–6 parts by weight of aluminum chloride.

The reaction temperature, i.e., the melt temperature, is between 140° and 170° C. The reaction is preferably carried out at a temperature between 155° and 160° C.

The hydrogen acceptors which may be used are of the conventional types and include oxygen and organic nitro compounds such as potassium m-nitrobenzenesulfonate, 4'-nitroacetanilide, m-dinitrobenzene, and others disclosed in U.S. Pat. No. 2,238,180. The preferred hydrogen acceptor is potassium m-nitrobenzenesulfonate. Between 8 and 15 parts, preferably between 10 and 12 parts of alkali metal chloride-aluminum chloride are used per part of 1,5 - dibenzoylnaphthalene. Between 0.9 and 1.8 moles, preferably between 1.1 and 1.3 moles of potassium m-nitrobenzenesulfonate, or equivalent of other hydrogen acceptor, are employed per mole of 1,5-dibenzoylnaphthalene. This is equivalent to betwen 0.65 and 1.30 parts, preferably between 0.79 and 0.93 parts, of potassium m-nitrobenzenesulfonate per part of 1,5-dibenzoylnaphthalene.

In the process of this invention, the 1,5-dibenzoylnaphthalene and the potassium m-nitrobenzenesulfonate are added simultaneously to the alkali metal chloride-aluminum chloride melt at the prescribed reaction temperature. The addition is made over a period of between 7 and 14, hours, preferably between 9 and 11 hours, while keeping the temperature within the prescribed limits.

When all of the reactants have been added, the melt is stirred for a short time at the reaction temperature until the ring closure is essentially complete. About two hours is sufficient.

The melt contains the product, dibenzo[a,h]pyrene-7,14-dione. The product can be separated in high yield and with excellent quality by conventional procedures. For instance, a melt can be decomposed with water and extracted with dilute hydrochloric acid, in accordance with the procedures of U.S. Pat. No. 2,238,180.

Also, the dibenzo[a,h]pyrene-7,14-dione can be halogenated in the melt, without isolation, as disclosed in U.S. Pat. Nos. 1,901,307; 2,838,525 and 3,024,254. If about two moles of bromine per mole of dibenzo[a,h] pyrene-7,14-dione are used, the product is essentially dibromodibenzo[a,h]pyrene-7,14-dione, Vat Orange 1.

EXAMPLE 1

To a molten mixture of 5,000 g. of anhydrous aluminum chloride and 1,300 g. of sodium chloride at 145–150° C., there is added 40 g. of 1,5-dibenzoylnaphthalene and 35 g. of potassium m-nitrobenzene sulfonate, allowing the temperature to rise to 150–155° C. Over a period of about nine hours, 510 g. of 1,5-dibenzoylnaphthalene and 440 g. of potassium m-nitrobenzenesulfonate are added. While adding 1,5-dibenzoylnaphthalene and potassium m-nitrobenzenesulfonate, 1400 g. anhydrous aluminum chloride is added at the rate of about 100 g. per ½ hour while the temperature is maintained at 150–160° C. The The reaction mixture is then stirred for about two hours at 155–160° C.

When the reaction is essentially finished, the sodium chloride-aluminum chloride melt contains an essentially quantiative yield of dibenzo[a,h]pyrene-7,14-dione of excellent purity.

The dibenzo[a,h]pyrene-7,14-dione can be separated by conventional procedures (as disclosed, for example, in U.S. Pat. No. 2,238,180) to obtain Vat Yellow 4, C.I. 59100.

Also, the above melt can be halogenated directly by procedures described in U.S. Pat. Nos. 1,901,307; 2,838,525 and 3,024,254. As an illustration, 550 g. of bromine is added to the product melt over a period of about 8 hours while maintaining a temperature of 150–155° C. After a further reaction period of 30 minutes at 150–155° C., the hot melt is drowned in dilute hydrochloric acid. The brominated product is separated by filtration to obtain Vat Orange 1, C.I. 59105, in high yield and excellent purity. The brominated product contains at least 31% bromine.

I claim:

1. In the process for producing dibenzo[a,h]pyrene-7,14-dione by heating 1,5-dibenzoylnaphthalene in an alkali metal chloride-aluminum chloride melt in the presence of an aromatic nitro compound as hydrogen acceptor, which compound, in addition to a nuclear-bound nitro group contains at least one other negative substituent, the improvement comprising simultaneously adding the 1,5-dibenzoylnaphthalene and the hydrogen acceptor to the melt, portion-wise, over a period of between 7 and 14 hours, in amounts such that the proportion of hydrogen acceptor to 1,5-dibenzoylnaphthalene so added is from 0.9 to 1.8 moles of the hydrogen acceptor per mole of 1,5-dibenzoylnaphthalene.

2. The process of claim 1 wherein the alkali metal chloride is sodium chloride.

3. The process of claim 1 wherein the melt contains one part of sodium chloride per 4–6 parts of aluminum chloride.

4. The process of claim 1 wherein the reaction temperature is between 140° and 170° C.

5. The process of claim 1 wherein between 8 and 15 parts of melt are used per part of 1,5-dibenzoylnaphthalene.

6. The process of claim 1 wherein the hydrogen acceptor is potassium m-nitrobenzenesulfonate.

7. The process of claim 1 wherein between 0.65 and 1.3 parts of potassium m-nitrobenzenesulfonate are used per part of 1,5-dibenzoylnaphthalene.

References Cited

UNITED STATES PATENTS

| | | | |
|---|---|---|---|
| 2,238,180 | 4/1941 | Moergeli et al. | 260—362 |
| 1,874,547 | 8/1932 | Kranzlein et al. | 260—362 |

JAMES A. PATTEN, Primary Examiner

E. J. SKELLY, Assistant Examiner